United States Patent [19]

Schaefer

[11] Patent Number: 4,723,509
[45] Date of Patent: Feb. 9, 1988

[54] CAT LITTER

[76] Inventor: Ernest R. Schaefer, 40 Country Corners Rd., Wayland, Mass. 01778

[21] Appl. No.: 806,642

[22] Filed: Dec. 9, 1985

Related U.S. Application Data

[63] Continuation-in-part of Ser. No. 756,162, Jul. 18, 1985, abandoned.

[51] Int. Cl.$^4$ .............................................. A01K 1/015
[52] U.S. Cl. ....................................................... 119/1
[58] Field of Search ............................................ 119/1

[56] References Cited

U.S. PATENT DOCUMENTS

| | | | |
|---|---|---|---|
| 3,983,842 | 10/1976 | Marion et al. | 119/1 |
| 4,203,388 | 5/1980 | Cortigene et al. | 119/1 |
| 4,305,345 | 12/1981 | Otoguro | 119/1 |
| 4,315,761 | 2/1982 | Larrson et al. | 119/1 X |
| 4,409,925 | 10/1983 | Brundrett et al. | 119/1 |

Primary Examiner—Robert P. Swiatek
Attorney, Agent, or Firm—Robert Gammons

[57] ABSTRACT

A material for use as cat litter comprising a composition of paper machine sludge combined in the presence of water with sodium bicarbonate and a hydraulic cement, dried and crushed to form coarse particles or extruded and chopped up to form pellets. Desirably, the composition includes an anti-static material and coloring.

7 Claims, No Drawings

CAT LITTER

BACKGROUND OF THE INVENTION

This application is a continuation-in-part of Ser. No. 756,162, filed July 18, 1985, now abandoned, entitled CAT LITTER.

It is the primary purpose of this invention to provide an improved cat litter in the form of particles and/or pellets which will absorb approximately 3 times as much moisture as cat litter now available, will control odor for an appreciably longer period of time, will minimize formation of dust, will not cake in the litter box or on the cat's fur, is heavy enough so that it will not be scattered from the litter box, will not easily crush underfoot, is not abrasive and, hence, will not scratch the floor or abrade rugs and is non-toxic and biodegradable.

SUMMARY OF THE INVENTION

As herein illustrated, the cat litter material of this invention is in the form of pellets or particles and is compounded of paper machine sludge, sodium bicarbonate and, optionally, portland cement combined in the presence of water to form a slurry, extruded, dried and chopped up into pellets or dried in sheet form and crushed to form coarse particles. Optionally, an antistatic and coloring or other decal material may be added.

The paper machine sludge is a by-product of paper making and comprises approximately 80% very short length wood fibers with some short length cotton fibers and 20% other solids. The wood and cotton fibers are present in the form of substantially pure cellulose, free of any substantial amounts of resin and/or resinous materials. The other solids comprise titanium oxide, precipitated silica and paper makers clay and exist in the proportions of approximately ⅓ titanium oxide, ⅓ silica and ⅓ paper makers clay. A preferred sludge is disclosed in my U.S. Pat. No. 4,497,688 which is incorporated herein by reference.

The sodium bicarbonate is commercially available in powdered form and when mixed with the sludge, reacts with the latter to degrade the cellulose fibers and, hence, increases the capacity of the mixture when dried to adsorb or absorb water.

The preferred portland cement is of the kind described in U.S. Pat. No. 3,860,433, also incorporated herein by reference. This is available from the U.S. Gypsum Company under the trademark "VHE Cement." The cement is very high, early strength, extremely fast setting hydraulic cement having very high compressive strength and contains beta $2CaO,SiO_2$, $3CaO,CaSO_4$ and chemically unbound $CaSO_4$ obtained by firing at a temperature between about 1200° and 1600° for about 1 to 5 hours, a mixture of a source, respectively, of $CaO,SiO_2$, $Al_2O_3$ and $SO_3$ in proportions of about 1 to 3 moles of $CaSO_4$ to about 0.5 to 2+2 n moles of $CaCO_3$ per mole of $Al_2O_3nSiO_2$ and grinding the resultant clinker wherein "n" is about 1.5 to about 2.5.

According to the method of manufacture, the product is compounded by mixing sludge, the powdered sodium bicarbonate and, optionally, the aforesaid portland cement in suitable proportions in water to form a slurry, spreading the slurry out, drying it in sheet form and then breaking it into course particles. Optionally, the slurry may be extruded in the form of strands dried and chopped into pellets. The particles are in the order of 1/32 to 1/16 of an inch and the pellets in the order of ¼ to ½ an inch.

As related above, the sodium bicarbonate reacts with the sludge, causing shrinkage thereof and when the sludge is dried and particulated, it absorbs water rapidly in relatively large amounts. Without the addition of the sodium bicarbonate, the dried sludge has very little adsorptive or absorptive capacity.

A number of different proportions of the individual ingredients can be compounded, taking into consideration efficiency as cat litter, packaging by weight and cost of materials. Examples of several preferred mixtures follow in the order of their preference. The ingredients can be combined in a conventional beater type mixer and dried by exposure to air or at a low temperature in an oven or extruded in the form of ropes and chopped up.

EXAMPLE 1

40 pounds of paper machine sludge wet (approxiamately 8 pounds dry weight)
9 pounds of hydraulic cement
4 ounces sodium bicarbonate

EXAMPLE 2

84 pounds of paper machine sludge wet (approximately 17 pounds dry weight)
6 pounds of hydraulic cement
2 pounds of sodium bicarbonate

EXAMPLE 3

84 pounds of paper machine sludge wet (approximately 17 pounds dry weight)
30 pounds of hydraulic cement
2 pounds of sodium bicarbonate

EXAMPLE 4

14 pounds of paper machine sludge (approximately 3 pounds dry weight)
3 pounds of hydraulic cement
8.8 ounces of sodium bicarbonate In each of the Examples, the components are mixed in the presence of water to form a uniform slurry, air-dried or dried in an oven at approximately 170° F. and crushed to form particles of 1/32 to 1/16 inch or extruded, dried and chopped up to provide pellets of ¼ to ½ inch. The particulate material is appropriate for small cats and the pellets for larger, more active cats. Optionally, an appropriate or distinctive color may be added to the composition during mixing and, after drying, the particles may be spray-coated with an anti-static material in the form of dimethyl chloride.

The portland cement may be omitted from each of the aforesaid examples. However, its inclusion is advantageous in that it does add weight to the mixture so that it does not scatter readily in use, inhibits crushing and the formation of dust and enhances the absorption of water. Although in all of the aforesaid Examples the paper machine sludge used is of the kind and composition disclosed in U.S. Pat. No. 4,497,688 and the portland cement is of the kind described in U.S. Pat. No. 3,860,433, it is within the scope of the invention to use paper machine sludge and portland cement other than that disclosed in the aforesaid patents.

The material produced according to the aforesaid Examples has been found, upon extensive testing, to be absorptive of water in an amount approximately 3 times greater than commercially available cat litter, to suppress and control odor for a substantially longer period of time than other litters, to be substantially less dust-forming than conventional litters, to be non-caking and non-adherent to cat fur, to be non-abrasive and, hence, will not scratch floors or tiles, to be non-staining, non-toxic, biodegradable and absorptive not only of water, but cleaning oils and the like. In fact, it has been found that the material will help to keep the floor where the litter box is located free of stains. In contrast to clay-based litters, the material as herein described can be flushed down the toilet without danger of clogging.

It should be understood that the present disclosure is for the purpose of illustration only and includes all modifications or improvements which fall within the scope of the appended claims.

What is claimed is:

1. The method of manufacturing litter comprising mixing with paper machine sludge comprised predominantly of cellulose fibers, sodium bicarbonate and portland cement, drying the mixture and pulverizing the dried mixture.

2. A cat litter comprising a mixture of paper machine sludge, a commercial sodium bicarbonate, and portland cement, combined in the presence of water, to form a slurry, dried in sheet form, and crushed to form granules, or extruded, dried and chopped up to form pellets.

3. A cat litter according to claim 2 wherein the portland cement contains beta $2CaO,SiO_2$, $3CaO,CaSO_4$ and chemically unbound $CaSO_4$ obtaining by firing at a temperature between about 1200° and 1600° for about 1 to 5 hours, a mixture of a source of, respectively, $CaO,SiO_2$, $Al_2O_3$ and $SO_3$ in proportions of about 1 to 3 moles of $CaSO_4$ to about $(0.5$ to $2)+2n$ moles of $CaCO_3$ per mole of $Al_2O_3nSiO_2$ and grinding the resultant clinker where "n" is about 1.5 to about 2.5.

4. A cat litter compounded of paper machine sludge and sodium bicarbonate in the ratio of approximately 8 pounds dry weight of paper machine sludge and 4 ounces of sodium bicarbonate, and 9 pounds of portland cement.

5. A cat litter comprising a composition of paper machine sludge and sodium bicarbonate in the proportions of approximately 17 pounds dry weight of paper machine sludge and 2 ounces of sodium bicarbonate, and approximately 6 pounds of hydraulic cement.

6. A cat litter comprising a composition of paper machine sludge and sodium bicarbonate in the proportion of approximately 7 pounds of dry weight sludge and 2 pounds of sodium bicarbonate, and approximately 30 pounds of portland cement.

7. A cat litter comprising a composition of paper machine sludge and sodium bicarbonate in the proportion of approximately 3 pounds dry weight of paper machine sludge and 8.8 ounces of sodium bicarbonate, and approximately 3 pounds of portland cement.

* * * * *